United States Patent

[11] 3,601,336

[72] Inventor Larry T. Preston
4023 Haverford Ave., Philadelphia, Pa. 19404

[21] Appl. No. 792,297
[22] Filed Jan. 21, 1969
[45] Patented Aug. 24, 1971

[54] MAGNETIC COMPUTER TAPE REEL
6 Claims, 7 Drawing Figs.

[52] U.S. Cl. .................... 242/197, 206/52 F, 242/68.3, 242/71.1
[51] Int. Cl. .................... G11b 23/10
[50] Field of Search .................... 242/197, 198, 199, 200, 194, 71.1, 71.2, 68.3; 206/52, 54

[56] References Cited

UNITED STATES PATENTS

| | | | |
|---|---|---|---|
| 1,804,332 | 5/1931 | Gentiluomo | 242/71.1 |
| 1,840,647 | 1/1932 | Wheatley | 206/52 F |
| 3,111,281 | 11/1963 | Sinkewitsch | 242/200 |
| 3,245,629 | 4/1966 | Rost | 242/68.3 X |
| 3,442,373 | 5/1969 | Kelley | 206/52 F |
| 3,454,961 | 7/1969 | Tatter | 242/197 |
| 3,467,340 | 9/1969 | Rosenburgh | 242/197 |

*Primary Examiner*—George F. Mautz
*Attorney*—Jackson, Jackson & Chovanes

ABSTRACT: This magnetic tape reel has a hub portion which turns with the drive on which it is mounted, bearings including a rolling surface contact which are on the hub portion, and an outside portion on the bearings. The outside portion has identificatory matter on its outer edge and in part of its outer edge there is an opening through which the magnetic tape can go, and the outside portion will remain stationary while the hub portion is turning during the rolling and unrolling of the tape.

INVENTOR,
Larry T. Preston
BY
Jackson, Jackson and Chovanes
ATTORNEYS

MAGNETIC COMPUTER TAPE REEL

SUMMARY OF THE INVENTION

The present invention relates to reels for magnetic tape.

A purpose of the invention is to provide a form of such a reel which will be more convenient in use and storage.

A further purpose of the invention is to provide a form of such a reel which will do away with any necessity for a separate cover of some kind for storage, which would have to be removed for use.

A further purpose of the invention is to provide a form of such a reel in which the subject matter of the tape can be most readily and conveniently identified, both in use and in storage.

A further purpose of this invention is to provide a form of such a reel which will tend to minimize error and confusion in storing and locating particular reels.

A further purpose of this invention is to provide a form of such a reel having a reduced rotational moment of inertia in actual operation.

A further purpose of this invention is to provide a magnetic tape reel which has a hub portion adapted for mounting on a magnetic tape drive, a bearing setup including a rolling surface contact which setup is mounted on the hub portion, and an outside portion mounted on the bearing setup, with the outside portion having identificatory matter mounted on its outside edge and an opening for the tape to come in or out, and the outside portion being adapted to remain stationary while the hub portion turns.

Further purposes will appear from the remainder of the specification and the claims.

BRIEF DESCRIPTION OF THE DRAWINGS

In the drawings, we have chosen to illustrate certain only of the particular embodiments in which my invention may appear, the forms shown being chosen from the standpoints of convenience in illustration, satisfactory operation and clear demonstration of the principles involved.

DESCRIPTION OF PARTICULAR EMBODIMENTS AND THE LIKE

Figures 1, 2, 3:
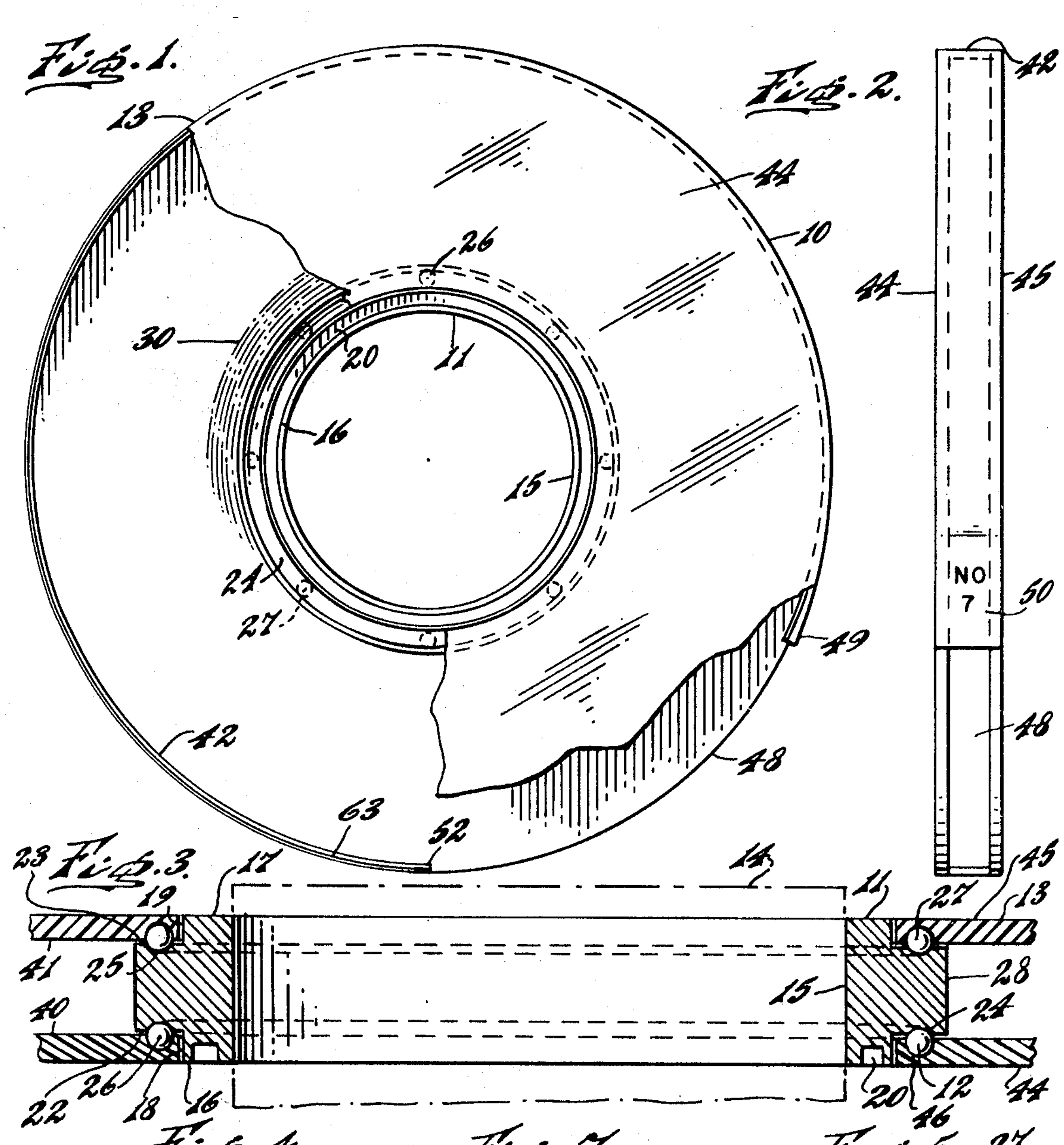
FIG. 1 is a rear elevational view, partly broken away, of one embodiment of the magnetic tape reel I have invented, with some magnetic tape shown fragmentarily in phantom on it.
FIG. 2 is a side and elevational view of the same embodiment of the reel, without showing the magnetic tape.
FIG. 3 is a fragmentary horizontal cross-sectional view through the center of this embodiment of the reel, enlarged and showing only the more central portion, and in addition showing in phantom a suitable reel motor hub forming part of the magnetic tape drive.
Figure 4:
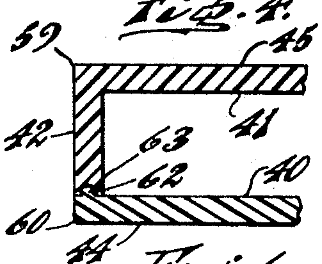
FIG. 4 is a fragmentary section along the same plane as FIG. 3, but of only the edgemost part of the reel.

Describing in illustration but not in limitation, and referring to the drawings:

In the embodiment of FIGS. 1 through 5, magnetic tape reel 10 of my invention includes hub member 11, bearing setup 12 and outer member 13. It is intended to be mounted on a suitable reel motor hub 14 which forms part of the magnetic tape drive (not otherwise shown).

Hub member 11 is annular in shape. Its cylindrical surface 15 on the inner side of the annulus is adapted to fit upon the cylindrical outside surface of the reel motor hub 14 of the magnetic tape drive, and be held there by a friction fit, the outside surface of the reel motor hub being suitably of rubber.

The sides 16 and 17 of hub member 11 extend radially outwardly at right angles to the cylindrical surface 15 and to the axis of rotation of the reel motor hub and of the hub member when mounted upon it; but part way along as the sides go radially outwardly, they have in each case a stepback, 18 and 19 respectively. Furthermore, on side 16 before the step is reached, the hub member 11 has groove 20, for insertion of a write-enable ring when it is desired to be able to write on the magnetic tape.

The side surfaces, 22 and 23 respectively, of hub member 11 beyond the point at which the cylindrically surfaced step back occurs, each have an annular groove 24 and 25 respectively. These side surfaces will be seen to be radially extending surfaces likewise perpendicular to the axis of rotation of the reel motor hub, which surfaces are not as far out axially from the center of the device as the sides 16 and 17 before the step. This groove in each case serves as a race for its particular set of balls in the functioning of the bearing setup 12, the sets of balls in question being 26 and 27 in the respective instances.

The radially outermost surface of the annulus which constitutes hub member 11 is outer cylindrical surface 28. This cylindrical surface is at least broad enough to take the entire width of the particular size or sizes of magnetic tape 30 for which the particular reel is intended, the magnetic tape in one position being intended to be rolled up around the annulus with its innermost layer lying against outer surface 28 of the hub member of the reel.

Hub member 11 can suitably be made of a light metal, such as an aluminum alloy.

Outer member 13 of the reel, which might also be called identificatory member 13, consists of two side portions, 40 and 41 respectively, extending radially outwardly, perpendicularly to the axis of rotation of the reel motor hub, from immediately beyond the points at which the respective steps 18 and 19 of the hub member go back, and also an edge portion or peripheral portion 42, which joins the two side portions together around most of their periphery.

More specifically, the axially outermost surfaces 44 and 45 of the respective side portions 40 and 41 will be in prolongation of the axially outermost surfaces of the hub member, but with sufficient clearance between the hub member and the outer member's side portions to permit free relative rotation as between them.

Figure 5:
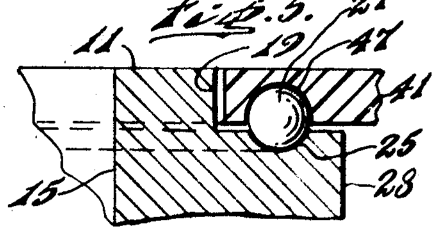
FIG. 5 is a still further enlarged fragmentary section along the same plane as FIGS. 3 and 4, devoted to the bearing and associated portions of this embodiment, on one side of the hub portion, and omitting any showing of the reel motor hub.

Outer member 13 is rotatably mounted upon hub member 11 by means of bearing setup 12. More specifically, as shown in FIGS. 3 and 5, each individual ball is rotatably held in its own individual socket in outer member 13, balls 26 being rotatably held in sockets 46 in side portion 40 and balls 27 being rotatably held in sockets 47 in side portion 41. As already mentioned, the respective sets of balls ride in their respective grooves 24 and 25 in the hub member 11.

As already indicated, edge portion 42 of outer member 13 does not surround the interior of the reel throughout the entire periphery of the reel, but there is an opening 48 in this edge portion. At one end of the edge portion, next to the opening 48, the edge portion 42 thickens in V-fashion at 49 as it goes toward the opening; and at this place 49 where it thickens, edge portion 42, whose outer surface is otherwise cylindrical in shape, has its outer surface extending gradually out substantially beyond the cylindrical as it approaches opening 48 so that, as shown in FIGS. 1 and 2, the portion extending gradually outward terminates at the edge of the opening in a ledge facing the opening and extending in a direction parallel to the axis across the entire peripheral edge of the outer member 13.

On the outer surface in this area which gradually protrudes, will be put the tape number or other matter for identification or description relative to the particular reel, as shown it 50 in FIG. 2; and this identificatory matter will preferably be so positioned as to be in upright legible form when the reel is in the position shown in FIG. 2, with the protruding portion 49 located higher than the opening 48.

It is desirable that opening 48 be large enough to permit magnetic tape to run in or out of the reel freely from or to a given point outside, both in unwound and fully wound condition of the tape inside, without the necessity, if the outer member remains stationary is a proper position, of touching the edgemost portion 42 either in the area of the thickened portion 49 or at the opposite end of the opening at 52. In a typical case, an opening 48 extending over an arc of on the order of 63°, or in other words, on the order of seven-fortieths of the circumference, will function thus. To state the size of the opening on the order of nearly 6 inches in a straight line from end to end of the opening in the case of a reel having an outside diameter of 10½ inches. However, of course the relative size of opening for this, depends at least partly on the relative overall outside diameter of the hub member as compared to the inside diameter of the identificatory member. Furthermore, the opening can of course be larger than the minimum which will satisfy the above condition if desired. As will be seen in FIGS. 1 and 2, opening 48 extends across the entire distance between positions of the side portions throughout its length, and thus, like cylindrical surface 28 lying between those side portions, is at least as broad as the entire width of the particular size or sizes of magnetic tape 30 for which the particular reel is intended.

The outer member 13 is preferably physically constructed in two parts that can be taken apart one from the other. Part 59 includes side portion 41 and also includes most of edge portion 42. Part 60 includes side portion 40 and a certain amount of the edge portion and has a projection 62 which fits into a corresponding groove 63 in part 60, thus making the outer member 13 a single unitary thing except when projection and groove are separated from each other.

Outer member 13 should be of a material which is stiff enough to substantially hold its shape in operation of the reel with tape, so that the side portions maintain their straight radial position while the reel is rotating and that the side portions, the balls and the hub member remain in position to cooperate together. This does not mean that it should be brittle. However, the outer member's material should also preferably be flexible enough so that by making projection 62 narrower at its neck than further out on the projection, and by making the corresponding groove 63 narrower at the mouth of the groove than at an interior point in the groove, a snap-in type of joinder between projection and groove can be made, holding the two in place. However, it is possible to rely mainly or wholly on friction in the areas of jointure of 62 and 63 to hold together the two parts 59 and 60 of outer member 13.

It will be evident that taking outer member 13 apart also enables outer member 13 in its two parts to be separated from hub member 11, with the balls remaining in their sockets in the respective parts of outer member 13.

Outer member 13 can be of any suitable material, whether metal or plastic, such as for example polyethylene; but plastic has the advantage of being lighter. Furthermore, outer member 13 is preferably transparent or at least translucent, using translucent here and in the claims in the sense of permitting enough light through to enable a viewer to judge generally of the outlines of what is inside, and specifically to judge how much tape is rolled up on the reel at any given moment. It is also possible and somewhat desirable to have outer member 13 in some color, such as red, green or blue for example.

Figure 6:
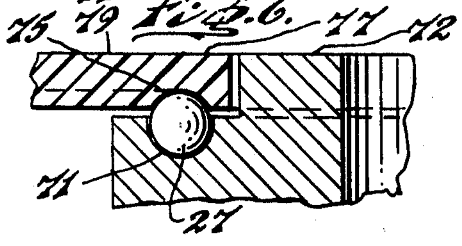
FIG. 6 is a section similar to that of FIG. 5, except that it is over on the opposite side of the center, but of another embodiment of the reel of the invention, which other embodiment is the preferred embodiment.

In the preferred embodiment of the magnetic tape reel which I have invented, shown in FIG. 6, pockets 71 rotatably holding balls 27 are in hub members 72, with groove 75 operating as the race for these balls being in side portion 77 of outer member 79; and on the opposite side of the hub member, axially speaking, the individual ball pockets are likewise in the hub member and the ball race is in the outer member. The preferred embodiment which is shown in FIG. 6 is otherwise the same as that of FIGS. 1 to 5, and indeed all the features of the overall structure visible in FIGS. 2 and 4 apply equally well to both embodiments.

It will be evident that in the case of the preferred form of FIG. 6, when the outer member and hub member are separated from each other by taking the outer member apart, the balls will remain with the hub member.

Figure 7:
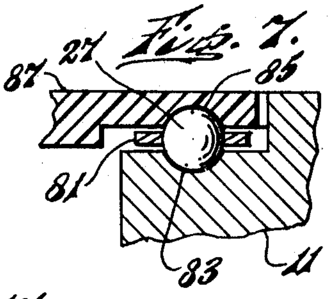
FIG. 7 is a section similar to those of FIGS. 5 and 6, but of still a third embodiment of my invention.

The form of my invention illustrated in FIG. 7 has balls 27 kept apart from each other by retainer 81 and running in both groove 83 forming a raceway in hub member 11 and groove 85 forming a raceway in outer member 87, with a similar setup of grooves, balls and retainer on the opposite side of the reel.

In this form of FIG. 7 it will be evident that when the outer member and hub member are separated from each other, the balls and retainers will remain with neither, but each retainer with its particular ring of balls will be separate from both the outer member and the hub member.

The operation of the device is the same for all the embodiments shown, and will be illustrated by a description based on the form of FIGS. 1–5.

When the tape in the reel is in use, the magnetic tape reel will of course be mounted upon the reel motor hub or projection 14 to rotate with that hub. The hub member 11 of the magnetic tape reel will turn with that reel motor hub and the magnetic tape 30 within the reel will of course turn with the hub member, paying out or rolling up as the case may be, depending on whether the particular reel under consideration happens to be operating as a supply reel or a takeup reel at the time.

Under these circumstances, however, with hub member 11 turning with the tape, the outer member 13 will be free to remain stationary, and the overall setup is such, bearing in mind among other things the inertia of the outer member and the low friction of the bearings, that the outer member 13 will in fact tend to remain substantially stationary while the hub member 11 is turning.

When the use of the reel in operation is over, the reel can be returned to storage. There it will preferably be put on a rack with projecting portion 49 resting against the forward edge of the rack in such a manner as to specifically locate identifying matter 50 at a uniform place in front, which place is convenient for reading the identification. The rack's own label for the particular bin where the particular reel is located can suitably be right under, or at least close to, the point where the reel's label 50 will be, for instant comparison.

Thus, the present magnetic tape reel will be highly useful and advantageous, both in use and in storage.

In use, the label of the reel can be read at any time, without any necessity to take action temporarily stopping the paying out or taking up of the magnetic tape. Furthermore, drag on the reel motor will be minimized.

When the reel is taken out of storage for use, or put back into storage, there will be no cover of any kind to take off or put on, and to temporarily lay aside in between, with the waste of time and effort the handling of such a cover always entails. The elimination of the cover also eliminates the possibility that by putting on the wrong cover before storing the magnetic tape reel in a tape library, the magnetic tape reel may be completely lost in that library. The extra weight and bulk of the separate cover, with corresponding wasted storage space, is likewise eliminated.

When in storage, the magnetic tape reel can easily be identified without having to remove it from its storage place. This will make it easy to locate the reel when use is desired. It will also make it easy for a single person to take inventory. Furthermore, it will largely eliminate errors in placing tapes into and removing them from identified storage racks, as in a tape library, since as indicated, the identification marks on tape and rack can be instantly compared. It will be recognized that various foregoing features such as specifically a reel motor hub whose outside is of rubber and which forms a part of a magnetic tape drive, the write-enable ring, the reel having a size of 10½ inches, the use of the reels as supply and takeup reels, and the tape library, are features already well known as part of what is already common and in many cases normal in the use of magnetic tape in the computer field, and indeed such a thing as a "write-enable ring" is peculiar to a reel for magnetic computer tape, such a feature and terminology not properly applying to other magnetic tape. Thus, use as a reel for magnetic computer tape is especially contemplated herein.

In view of my invention and disclosure variations and modifications to meet individual whim or particular need will doubtless become evident to others skilled in the art to obtain all or part of the benefits of my invention without copying the article shown, and I therefore claim all such insofar as they fall within the reasonable spirit and scope of my claims.

I claim:

1. A magnetic computer tape reel for use on a rotatable projection of a magnetic computer tape drive, such use being in a place where the outer edge surface of the reel can be looked at any time, and the reel being in the same form both in storage and in use, which reel comprises:

a. a hub member adapted to be mounted on the projection to rotate with that projection and having a radially outwardly facing cylindrical surface adapted to support magnetic computer tape in a rolled-up position;

b. A bearing setup including a rolling surface contact which bearing setup is mounted on the hub member, and, c. An identificatory member generally cylindrical in outline mounted on the bearing setup and including identificatory material located on the generally cylindrical outside surface of the reel, the structure of the identificatory member being such as to permit passage by the tape between a place outside the reel and the rolled-up position of the tape.

2. A magnetic computer tape reel of claim 1, in which the bearing setup includes two sets of such bearings including balls, each set toward a different end axially of the hub member, and the identificatory member has two side portions, one located to cooperate with one set of bearings and the other with the other.

3. A magnetic computer tape reel of claim 2, in which the balls of each set of bearings are located in depressions in faces of the hub member and the identificatory member, which faces are perpendicular to the axis of rotation of the hub member when the hub member is mounted on the rotatable projection.

4. A magnetic computer tape reel for use on a rotatable projection of a magnetic computer tape drive, such use being in a place where the outside edge surface of the reel can be looked at any time, which comprises:

a. A hub member having a surface adapted to fit upon the rotatable projection in order to mount the hub member upon the projection to rotate therewith the hub member having also a radially outer cylindrical surface adapted to support magnetic computer tape in rolled-up position thereon;

b. Two sets of bearings including rolling surface contact which are mounted on the hub member, one on either side axially of the above-mentioned outer cylindrical surface; and c. An identificatory member mounted on the bearings by means of radially extending side portions, one on each side of the above-mentioned rolled-up position of the tape, the identificatory member having also a peripheral portion mostly cylindrical in outline which is radially beyond the above mentioned rolled-up position of tape, on which peripheral portion is located identifactory material, said peripheral portion including structure near the identificatory material, which structure defines an opening sufficient to permit tape to run between a place outside the reel and the above mentioned rolled-up position of the tape, and the peripheral portion extending beyond the cylindrical, in the area where is located the identificatory material, to a place at the edge of the opening where it terminates in a ledge facing the opening.

5. A magnetic computer tape reel for use on a rotatable projection of a magnetic computer tape drive, such use being in a place where the outside edge surface of the reel can be looked at at any time, the reel being in the same form in both storage and use, which reel comprises:

a. a hub member having a surface adapted to be mounted on that projection to rotate therewith and having an outwardly directed cylindrical surface adapted to support magnetic computer tape in rolled-up position;

b. two sets of bearings including rolling surface contact by means of balls, which bearing sets are mounted on the hub member, one set toward one end of it axially speaking, and the other set toward the other; and c. an outer member mounted on the bearings to give free rotatability as between outer member and hub member, the outer member having two radially extending sides extending from the bearings to the periphery, one on each side of the above mentioned rolled-up position of the tape, and a peripheral portion beyond that rolled-up position which peripheral portion is mostly cylindrical in outline and connects the sides together but leaves an opening for the tape to run between the interior and exterior of the reel, said peripheral portion including a place on the periphery of the reel adapted for putting identificatory material on, which place extends beyond the cylindrical and terminates in a ledge facing the opening at the edge of the opening.

6. A magnetic computer tape reel for use on a reel motor hub of a magnetic computer tape drive, which reel comprises:

a. an annular hub member located around an axis and having a radially inwardly directed cylindrical surface adapted to be mounted on the hub to turn therewith, the hub member also having as its radially outside surface a first radially outwardly directed cylindrical surface adapted to support magnetic computer tape in rolled-up position thereon, and the hub member having radially extending surfaces perpendicular to the axis and extending toward the axis from the ends of the above mentioned radially outwardly directed cylindrical surfaces extending axially outwardly from the radially inward end of the previously mentioned radially extending surfaces, and pockets adapted to hold balls for bearing purposes in the hub member which pockets form depressions in the radially extending surfaces;

b. balls rotatably held in the pockets and protruding through the radially extending surfaces; and c. an identificatory member made of colored, at least translucent, plastic and mounted on the balls for overall rotatability relative to the hub portion, this identificatory member having two annular radially extending side portions with grooves on their axially inward sides to serve as races for the balls, said side portions being one on either side of the above mentioned rolled-up position of the tape, and each constituting a continuous unitary wall along its entire side of that position beyond the other radially outwardly directed cylindrical surfaces of the hub member, and a peripheral portion mostly cylindrical in outline which is located on the periphery of the reel, which is also the periphery of the identificatory member, and joining the two side portions together in an area radially beyond the rolled-up position of the tape, the peripheral portion extending between the side portions continuously around the major arc of the periphery of the reel between two places approximately seven-fortieths of the circumference apart, the periphery of the reel between the side portions being open to a width at least as great as that of the tape throughout the minor arc between these two places, and the outside surface of the peripheral portion extending gradually somewhat beyond cylindrical in the area of one of these places and terminating in a ledge facing the open portion at the edge of the open portion and having in that area identificatory material which is upright and legible from a point radially beyond the peripheral portion when the reel is held with that area higher than the open portion of the periphery of the reel, and the identificatory member being functionally a unitary piece when forming part of the device as a whole, and in operation forming with the balls and the hum member a single article though the article has a continuous free capability of relative rotation as between hub member and identificatory member, but the identificatory member having a tongue-and-groove-structured snap-in connection located toward one side of the periphery and running circumferentially throughout the entire previously mentioned major arc in the periphery to join the identificatory member together, which tongue-and-groove-structured snap-in connection will normally be closed out can be opened without permanent injury to the device to permit temporary separation of the identificatory member into two parts, enabling separation of the identificatory member from the balls and the rest of the device.